US008380253B2

(12) United States Patent
Li et al.

(10) Patent No.: US 8,380,253 B2
(45) Date of Patent: Feb. 19, 2013

(54) VOICE SWITCHING FOR VOICE COMMUNICATION ON COMPUTERS

(75) Inventors: Qin Li, Houston, TX (US); Chao He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 12/032,589

(22) Filed: Feb. 15, 2008

(65) Prior Publication Data

US 2009/0207763 A1  Aug. 20, 2009

(51) Int. Cl.
*H04B 3/20* (2006.01)
(52) U.S. Cl. ........... 455/569.1; 455/561; 455/570; 379/406.01; 379/388.01
(58) Field of Classification Search .......... None
See application file for complete search history.

(56) References Cited

U.S. PATENT DOCUMENTS

| 4,039,753 A | 8/1977 | Balogh et al. |
| 4,069,395 A | 1/1978 | Nash |
| 4,275,398 A | 6/1981 | Parker et al. |
| 4,359,606 A | 11/1982 | Shoichi |
| 4,636,586 A | 1/1987 | Schiff |
| 4,696,015 A | 9/1987 | Palicot et al. |
| 4,696,032 A | 9/1987 | Levy |
| 5,099,472 A | 3/1992 | Townsend et al. |
| 5,263,019 A | 11/1993 | Chu |
| 5,305,307 A | 4/1994 | Chu |
| 5,323,459 A | 6/1994 | Hirano |
| 5,353,348 A | 10/1994 | Sendyk et al. |
| 5,430,796 A | 7/1995 | Komoda et al. |
| 5,454,041 A | 9/1995 | Davis |
| 5,477,534 A | 12/1995 | Kusano |
| 5,542,000 A | 7/1996 | Semba |
| 5,559,793 A | 9/1996 | Maitra et al. |
| 5,619,582 A | 4/1997 | Oltman et al. |
| 5,646,990 A | 7/1997 | Li |
| 5,666,407 A | 9/1997 | Pfeifer |
| 5,680,450 A | 10/1997 | Dent et al. |
| 5,721,730 A | 2/1998 | Genter |
| 5,923,749 A | 7/1999 | Gustafsson et al. |

(Continued)

FOREIGN PATENT DOCUMENTS

| GB | 2269968 | 3/1996 |
| WO | WO 2007147033 A2 | 12/2007 |

OTHER PUBLICATIONS

Ahgren, "Teleconferencing, System Identification and Array Processing," IT Licentiate Thesis, Uppsala University Department of Information Technology, <http://www.it.uu.se/research/publications/lic/2001-012/2001-012.pdf>, 75 pages, Oct. 2001.

(Continued)

*Primary Examiner* — Asad Nawaz
*Assistant Examiner* — Jason Harley
(74) *Attorney, Agent, or Firm* — Klarquist Sparkman, LLP

(57) ABSTRACT

A voice communication end device performs quality checks to determine whether acoustic echo cancellation would be ineffective, such as due to noise or clock drift or discontinuities between incoming and outgoing voice channels. In the case where echo cancellation would prove ineffective, the device falls back on a tri-state voice switching operation that includes a bi-direction state in which both channels are on in full duplex operation, which provides a smoother transition switching between active channels. The tri-state voice switching supports both voluntary transitions where the active user voluntarily stops to yield the active channel, and forced transitions where the active user is forcedly interrupted by the other user speaking more loudly.

14 Claims, 3 Drawing Sheets

U.S. PATENT DOCUMENTS

| | | | |
|---|---|---|---|
| 6,002,776 A | 12/1999 | Bhadkamkar et al. | |
| 6,044,150 A | 3/2000 | Rigstad et al. | |
| 6,051,722 A * | 4/2000 | Honda et al. | 549/407 |
| 6,078,645 A | 6/2000 | Cai et al. | |
| 6,081,722 A * | 6/2000 | Duque-Anton et al. | 455/452.2 |
| 6,169,728 B1 * | 1/2001 | Perreault et al. | 370/235 |
| 6,205,124 B1 | 3/2001 | Hamdi | |
| 6,212,273 B1 | 4/2001 | Hemkumar et al. | |
| 6,215,880 B1 | 4/2001 | Hasegawa | |
| 6,219,418 B1 | 4/2001 | Eriksson et al. | |
| 6,324,170 B1 | 11/2001 | McClennon et al. | |
| 6,377,679 B1 | 4/2002 | Hashimoto et al. | |
| 6,418,203 B1 | 7/2002 | Marcie | |
| 6,535,609 B1 | 3/2003 | Finn et al. | |
| 6,574,336 B1 | 6/2003 | Kirla | |
| 6,583,821 B1 | 6/2003 | Durand | |
| 6,707,910 B1 | 3/2004 | Valve et al. | |
| 6,724,736 B1 | 4/2004 | Azriel | |
| 6,738,358 B2 | 5/2004 | Bist et al. | |
| 6,748,086 B1 | 6/2004 | Venkatesh et al. | |
| 6,799,062 B1 * | 9/2004 | Piket et al. | 455/569.1 |
| 6,868,157 B1 | 3/2005 | Okuda | |
| 7,031,269 B2 | 4/2006 | Lee | |
| 7,085,370 B1 | 8/2006 | Arana-Manzano et al. | |
| 7,120,259 B1 | 10/2006 | Ballantyne et al. | |
| 7,433,463 B2 | 10/2008 | Alves et al. | |
| 2002/0090008 A1 * | 7/2002 | Cioffi et al. | 370/503 |
| 2002/0101982 A1 | 8/2002 | Elabd | |
| 2003/0174847 A1 | 9/2003 | Lane et al. | |
| 2003/0206624 A1 | 11/2003 | Domer et al. | |
| 2003/0206625 A9 * | 11/2003 | Ahmad | 379/406.12 |
| 2004/0001597 A1 | 1/2004 | Marton | |
| 2004/0001598 A1 | 1/2004 | Balan et al. | |
| 2004/0013275 A1 | 1/2004 | Balan et al. | |
| 2004/0081315 A1 | 4/2004 | Boland et al. | |
| 2004/0125942 A1 | 7/2004 | Beaucoup et al. | |
| 2004/0141528 A1 | 7/2004 | LeBlanc et al. | |
| 2005/0223113 A1 | 10/2005 | Hoffmann | |
| 2006/0018459 A1 * | 1/2006 | McCree | 379/406.06 |
| 2007/0019802 A1 | 1/2007 | Ubriaco et al. | |
| 2007/0041324 A1 | 2/2007 | Shenoi | |
| 2007/0047738 A1 | 3/2007 | Ballantyne et al. | |
| 2007/0165837 A1 | 7/2007 | Zhong et al. | |
| 2007/0165838 A1 | 7/2007 | Li et al. | |
| 2007/0263849 A1 | 11/2007 | Stokes et al. | |
| 2007/0263850 A1 | 11/2007 | Stokes et al. | |
| 2007/0280472 A1 | 12/2007 | Stokes et al. | |

OTHER PUBLICATIONS

Buchner et al., "Wave-Domain Adaptive Filtering: Acoustic Echo Cancellation for Full-Duplex Systems Based on Wave-Field Synthesis," Proceedings of the 2004 IEEE International Conference on Acoustics, Speech, and Signal Processing, vol. 4, 2004, pp. IV-117-IV-120.

Cisco, "Configuring Echo Cancellation," http://www.cisco.com/en/US/docs/ios/12_3/vvf_c/voice_port_configuration_guide/ch5_echo.html, © 1992-2008, 17 pages.

Ditech Communications, "Ditech's Voice Quality Assurance™," <http://www.ditechcom.com/platforms/DataSheets/OV_VQA.pdf>, 2 pages, 2005.

"Echo Cancellation," Chapter 4, pp. 1-8 (1990).

Herbordt et al., "Joint Optimization of Lcmv Beamforming and Acoustic Echo Cancellation," <http://www.slt.atr.jp/~wherbord/archives/mypub/HerbordtJoint_optimization_of_LCMV_beamforming_and_acoustic_echo_cancellation.pdf>, 4 pages.

Knowles Acoustics, "Beat the Noise and Echo, Communicate Anywhere via VoIP," <http://www.speechtechmag.com/whitepapers/knowlesa.pdf>, 11 pages, 2004.

Yensen et al., "Echo Target Determination Using Acoustic Round Trip Delay for Voice Over IP Conferences," Proceedings of the 1999 IEEE International Symposium on Circuits and Systems, vol. 4, 1999, pp. IV-348-IV-351.

Hoshuyama, "Nonlinear Echo Suppression Technology Enabling Quality Handsfree Talk for Compact Equipment," *NEC Technical Journal*, vol. 2, No. 2, 2007, pp. 27-30.

Frunze, "Echo Cancellation Demystified," Technical Paper, *SPIRIT Corp.*, undated, 13 pages.

Riley, "Techniques for Frequency Stability Analysis", *IEEE International Frequency Control Symposium*, May 4, 2003, pp. 10, 30, and 33.

* cited by examiner

Software 680 implementing tri-state voice switching

VOICE SWITCHING FOR VOICE COMMUNICATION ON COMPUTERS

BACKGROUND

Acoustic echo is a common phenomenon occurring in two-way voice communication when open speakers are used. For example, FIG. 1 illustrates one end 100 of a typical two-way communication system. The other end is exactly the same. In such a system, the far-end voice is played through a loud speaker 160 and captured by the microphone 110 in the system and sent back to the far end. The far-end user then hears his or her own voice with a certain delay.

There are a number of known approaches to reducing acoustic echo in two-way communication systems. However, these known approaches face particular problems when applied to voice communication systems using personal computers, such as internet telephony and voice chat applications on personal computers.

1. Acoustic Echo Cancellation

Acoustic Echo Cancellation (AEC) is a digital signal processing technology which is used to remove the acoustic echo from a speaker phone in two-way (full duplex) or multi-way communication systems, such as traditional telephone or modern internet audio conversation applications.

With reference again to the example near end 100 of a typical two-way communication system illustrated in FIG. 1, an Acoustic Echo Cancellation is used to remove echo of the far end user's voice. The example near end 100 includes a capture stream path and a render stream path for the audio data in the two directions. The far end of the two-way communication system is exactly the same. In the capture stream path in the figure, an analog to digital (A/D) converter 120 converts the analog sound captured by microphone 110 to digital audio samples continuously at a sampling rate ($fs_{mic}$). The digital audio samples are saved in capture buffer 130 sample by sample. The samples are retrieved from the capture buffer in frame increments (herein denoted as "mic[n]"). Frame here means a number (n) of digital audio samples. Finally, samples in mic[n] are processed, including encoding via a voice encoder 170 and sent to the other end.

In the render stream path, the system receives the encoded voice signal from the other end, decodes audio samples via voice decoder 180 and places the audio samples into a render buffer 140 in periodic frame increments (labeled "spk[n]" in the figure). Then the digital to analog (D/A) converter 150 reads audio samples from the render buffer sample by sample and converts them to an analog signal continuously at a sampling rate, $fs_{spk}$. Finally, the analog signal is played by speaker 160.

In systems such as that depicted by FIG. 1, the near end user's voice is captured by the microphone 110 and sent to the other end. At the same time, the far end user's voice is transmitted through the network to the near end, and played through the speaker 160 or headphone. In this way, both users can hear each other and two-way communication is established. But, a problem occurs if a speaker is used instead of a headphone to play the other end's voice. For example, if the near end user uses a speaker as shown in FIG. 1, his microphone captures not only his voice but also an echo of the sound played from the speaker (labeled as "echo(t)"). In this case, the mic[n] signal that is sent to the far end user includes an echo of the far end user's voice. As the result, the far end user would hear a delayed echo of his or her voice, which is likely to cause annoyance and provide a poor user experience to that user.

Practically, the echo echo(t) can be represented by speaker signal spk(t) convolved by a linear response g(t) (assuming the room can be approximately modeled as a finite duration linear plant) as per the following equation:

$$\text{echo}(t) = spk(t) * g(t) = \int_0^{t_e} g(\tau) \cdot spk(t-\tau) d\tau$$

where * means convolution, $T_e$ is the echo length or filter length of the room response.

In order to remove the echo for the remote user, AEC 210 is added in the system as shown in FIG. 2. When a frame of samples in the mic[n] signal is retrieved from the capture buffer 130, they are sent to the AEC 210. At the same time, when a frame of samples in the spk[n] signal is sent to the render buffer 140, they are also sent to the AEC 210. The AEC 210 uses the spk[n] signal from the far end to predict the echo in the captured mic[n] signal. Then, the AEC 210 subtracts the predicted echo from the mic[n] signal. This difference or residual is the clear voice signal (voice[n]), which is theoretically echo free and very close to the near end user's voice (voice(t)).

FIG. 3 depicts an implementation of the AEC 210 based on an adaptive filter 310. The AEC 210 takes two inputs, the mic[n] and spk[n] signals. It uses the spk[n] signal to predict the mic[n] signal. The prediction residual (difference of the actual mic[n] signal from the prediction based on spk[n]) is the voice[n] signal, which will be output as echo free voice and sent to the far end.

The actual room response (that is represented as g(t) in the above convolution equation) usually varies with time, such as due to change in position of the microphone 110 or speaker 160, body movement of the near end user, and even room temperature. The room response therefore cannot be predetermined, and must be calculated adaptively at running time. The AEC 210 commonly is based on adaptive filters such as Least Mean Square (LMS) adaptive filters 310, which can adaptively model the varying room response.

The nature of adaptive filtering requires that the microphone signal and the reference or speaker signal must be accurately aligned. On personal computers, timestamps are typically used to align the microphone and speaker signals. However, in practice, these timestamps are noisy and sometimes can be very wrong. One reason for this is that major operating systems, such as Microsoft Windows XP operating system, support numerous different audio devices. It is quite common that some audio device and its driver cannot provide accurate timestamps. In such case, the signals are often out of alignment, and the AEC fails to properly cancel echoes.

2. Voice Switching

Voice switching is a method used for half-duplex two-way communication. A typical example of such communication system has two signal channels: an incoming channel that receives the voice signal coming from the far-end, and an outgoing channel that sends the near end voice signal to the far-end. In a person-to-person scenario, the far-end may be another end user device. Alternatively, in a conference or multi-user scenario, the far end may be a server that hosts the multiple user conference. Based on voice activity being present at the two ends, the channels are selectively turned on or off. In other words, whenever there is voice activity in one channel, the other channel is turned off. By selectively switching off either incoming or outgoing channels based on voice activity in this way, the echo path is broken, which effectively removes acoustic echoes. The drawback of voice switching, however, is that it provides only half-duplex mode of communication.

Voice switching is commonly used on low-end desktop phones in speaker phone mode. A basic voice switching algorithm simply compares the strength of near-end and far-end voices and turns on the communication channel for the end with the stronger voice. It is relatively simple to compare voice activity on a standalone or dedicated phone device, because the microphone and speaker gains are known. During double talk scenarios (i.e., in which both ends are talking simultaneously), it is easy to estimate echo strength and thus easy to compare which voice is stronger. However, for voice communication applications on personal computers, any microphone or speaker may be connected to the computer, and the gains could be adjusted by the users at any time. This complicates the ability to estimate the echo strength, and therefore to compare the voice strength on the channels to accurately determine which channel should be switched on.

SUMMARY

The following Detailed Description concerns various improvements to voice switching techniques for avoiding or reducing acoustic echo in two-way communications applications and systems. These improved voice switching techniques can be used as a fall back solution for avoiding or reducing acoustic echo in cases that acoustic echo cancellation fails, such as where incoming and outgoing stream alignment is not possible due to inaccurate or erratic timestamps.

According to a first aspect, the improved voice switching technique uses tri-state transitions to provide smooth switching between active (i.e., switched on) voice channels. By contrast, conventional voice switching used for speaker phone mode on a typical standalone desktop phones make a simple binary decision switching between incoming voice channel and outgoing voice channel states. The improved voice switching technique includes transitions with an additional third or bi-directional state, in which both incoming and outgoing channels are on. This additional bi-direction state ensures a smooth channel switching without losing the initial syllable or word spoken at voice onset.

According to a further aspect, the improved voice switching technique has two types of conditions to transition between active channel states, which include voluntary and forced transitions. In a voluntary transition, the active user voluntarily gives up the active channel. This occurs when there is a segment of silence on the active voice channel that is longer than a threshold. In such case, the voice switching technique enters the bi-direction state. If the user on the other end begins to speak, then the active channel switches to that user. In this way, the user on the active channel has voluntarily permitted the other user to "take over" having the active channel. A forced transition occurs when the active user if forcedly interrupted by the user at the other end. For example, the user on the other end interrupts by speaking sufficiently louder than the user on the active channel.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following detailed description concerns various techniques and systems for voice switching in two-way communication systems. The described voice switching techniques use tri-state transitions and voluntary and forced transition conditions to provide smoother switching of active channels. The voice switching techniques are described with particular application in personal computer based telephony and voice chat applications, where the voice switching technique may be employed as a fall back measure in the case that acoustic echo cancellation fails to work properly (such as, due to inaccurate or noisy timestamps preventing alignment of microphone and speaker signals). However, the voice switching techniques can be applied more broadly to other two-way voice communication systems and scenarios.

The various techniques and tools described herein may be used independently. Some of the techniques and tools may be used in combination. Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

I. Overview Of Voice Switching Two-Way Communication System

Figure 4:
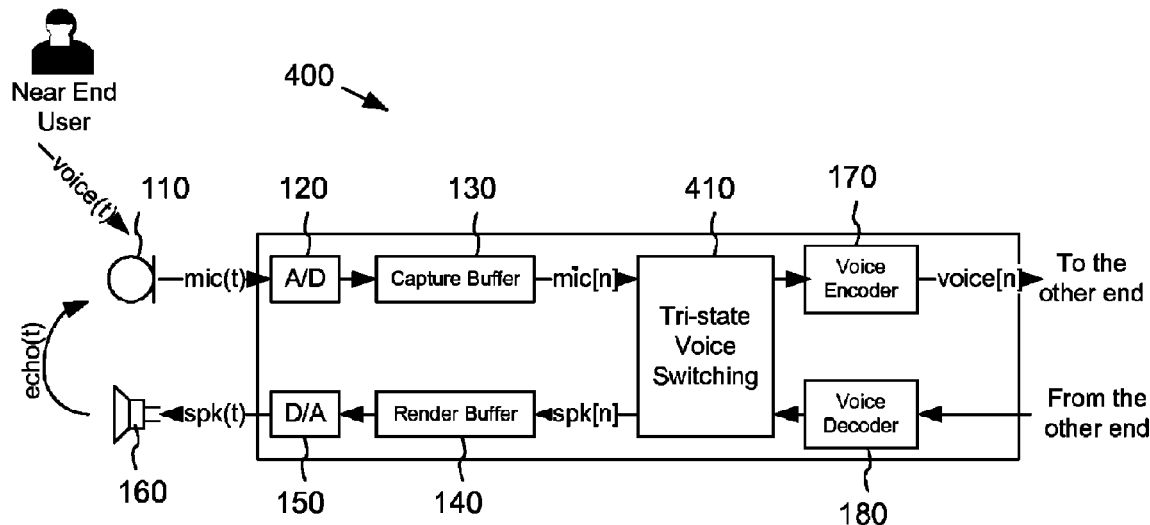
FIG. 4 is a block diagram illustrating one end of a two-way communication system utilizing voice switching.

FIG. 4 illustrates one end of a two-way communication system that includes voice switching with tri-state transitions along with voluntary and forced transition conditions, as described more fully below. The other end is typically, but not necessarily identical. Each end may be a communication device, such as a phone device or a personal computer with a telephony or voice chat application, or a game console, among other examples. In some implementations, the far end can be a communication server, such as a voice conferencing host server.

The illustrated near end 100 includes a capture stream path and a render stream path for the audio data in the two directions. In the capture stream path in the figure, an analog to digital (A/D) converter 120 converts the analog sound captured by microphone 110 to digital audio samples continuously at a sampling rate ($fs_{mic}$). The digital audio samples are saved in capture buffer 130 sample by sample. The samples are retrieved from the capture buffer in frame increments (herein denoted as "mic[n]"). Frame here means a number (n) of digital audio samples. Finally, samples in mic[n] are processed, including encoding via a voice encoder 170 and sent to the other end.

In the render stream path, the system receives the encoded voice signal from the other end, decodes audio samples via voice decoder 180 and places the audio samples into a render buffer 140 in periodic frame increments (labeled "spk[n]" in the figure). Then the digital to analog (D/A) converter 150 reads audio samples from the render buffer sample by sample and converts them to an analog signal continuously at a sampling rate, $fs_{spk}$. Finally, the analog signal is played by speaker 160.

The illustrated communication system end device includes tri-state voice switching 410 to avoid or reduce acoustic echo (echo(t)) of the far end speaker's voice being picked up by the microphone 110 and sent back to the far end.

II. AEC Quality Check

Figure 1:
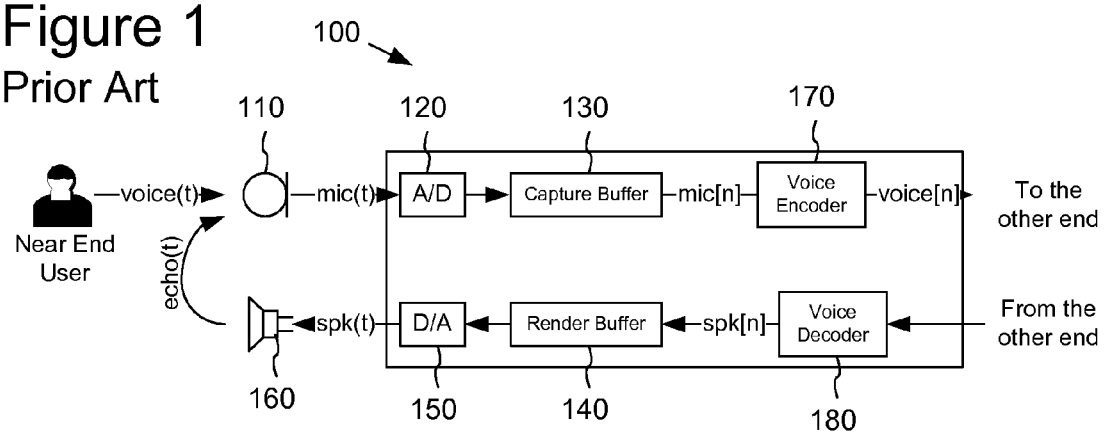
FIG. 1 is a block diagram illustrating one end of a typical two-way communication system in the prior art.
Figure 2:
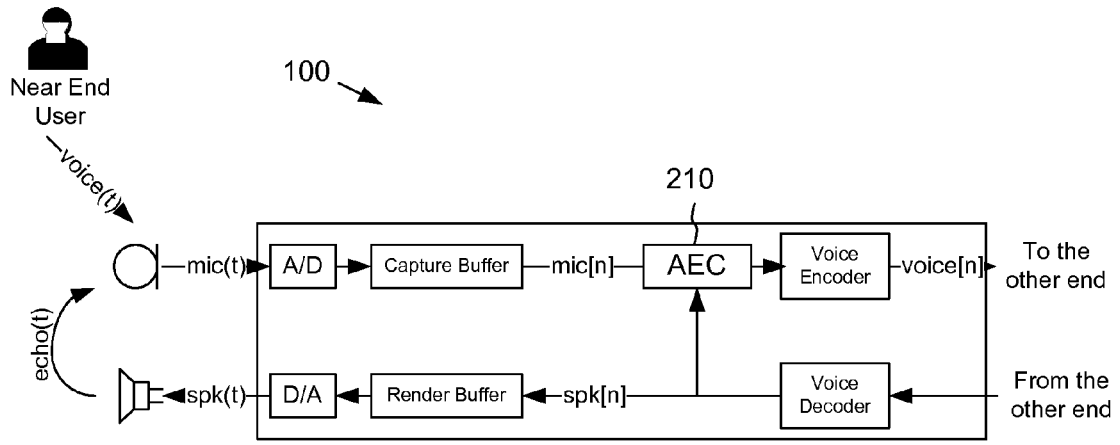
FIG. 2 is a block diagram of the two-way communication system of FIG. 1 with audio echo cancellation.
Figure 3:
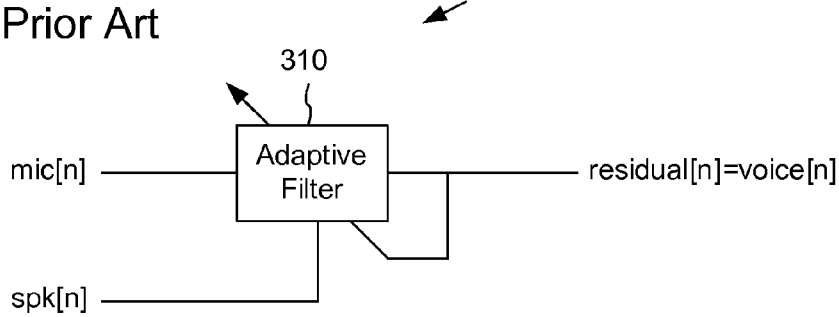
FIG. 3 is a block diagram of an implementation of audio echo cancellation based on an adaptive filter.

In general use, the two-way communication system provides full duplex two-way communication using acoustic echo cancellation 210, which is implemented as illustrated in FIG. 2 and discussed above. The tri-state voice switching 410 is enabled as a fall back mechanism under operating conditions where the acoustic echo cancellation 210 would fail to work properly to cancel echo or would introduce unacceptable noise or distortion effects. Accordingly, the two-way communication end 400 performs one or more quality checks to determine if the communication quality is sufficient for acoustic echo cancellation to work properly. The quality check can utilize multiple quality metrics, such as the level of noise or echo, clock drift rate (relative drift between microphone and speaker channel clocks), and detection of glitches or discontinuities in microphone and speaker channel clocks.

One example implementation of the two-way communication system performs two types of quality checks to assess potential effectiveness of acoustic echo cancellation, which are checking for timestamp errors and audio glitches. As for the timestamp errors, a timestamp marks the time when the first sample of a data frame is captured or rendered, such as at the A/D converter 120 (FIG. 4) and D/A converter 150, respectively. Ideally, the timestamp should match the device's stated sampling rate perfectly. For example, assuming the two-way communication end device 400 has a sampling rate of 16000 Hz and a 10 millisecond data frame is used by the device for capturing and rendering audio signals, then an audio data frame has 160 samples. This means that for each captured or rendered frame containing 160 samples, the timestamp of the first sample of consecutive frames should increase by exactly 10 milliseconds. In other words, the frame length calculated from the timestamps of consecutive frames should be exactly 10 milliseconds.

In practice, there may be errors in the timestamps, as discussed more fully in the background. This can result in the frame length calculated from timestamps being more or less than expected length (e.g., 10 milliseconds in this example implementation). If the long term average of the calculated frame length varies from the expected frame length, then the difference is called the timestamp drift. The drift divided by the nominal frame length is called the timestamp drift rate. A non-zero timestamp drift rate signifies the communication end device's sampling rate is off from its claimed or nominal rate. Finally, for each audio data frame, the difference of the respective frame's length from the long term average frame length is termed the "timestamp noise."

A second type of quality check is for audio glitches. Audio glitches mean discontinuities in audio stream. For audio data capture (e.g., the microphone 110 and A/D converter 120), audio glitches may occur when the application is not able to retrieve samples in the capture buffer in time so that the capture buffer becomes over full, which can result in lost audio capture samples. For the audio data rendering (e.g., from loudspeaker 160 and D/A converter), audio glitches can mean the application does not fill the render buffer quickly enough, so the audio rendering device has no data to play.

The quality check for effective audio echo cancellation in the example implementation includes checking for timestamp noise level of both the render and capture devices, the relative timestamp drift between capture and render devices, and how often audio glitches occur. The example implementation determines that the quality is not sufficient for effective audio echo cancellation if the render device timestamp noise is greater than 0.005 seconds, or if the capture device timestamp noise is greater than 0.002 seconds, or if the absolute relative drift rate between capture and render devices is greater than 0.3%, or if audio glitches occur more frequently than once per second.

In one example implementation, each end of the two-way communication system performs the quality check at preset intervals after the communication session (e.g., voice call or conference) is initiated. The initial quality check is done at about 4 seconds after the communication session starts, and is then repeated at 10 second intervals. If all quality checks produce the result that a sufficiently high quality for acoustic echo cancellation exists, then the two-way communication system end device may stop quality checks after 100 seconds. Initially, the two-way communication system end device provides full duplex using acoustic echo cancellation, and continues with that operation so long as the quality checks have the sufficiently high quality result. However, if a quality check fails, then the two-way communication system end switches over to tri-state voice switching 410 operation. In alternative implementations, the two-way communication system may continue quality checks throughout the communication session and switch to full duplex communication with acoustic echo cancellation when sufficiently high quality is detected, and otherwise switch over to the tri-state voice switching 410. The quality checking is performed independently for each end device, which may result in one end device having sufficiently high quality to operate in full duplex with acoustic echo cancellation while the other device has insufficient quality and falls back to the tri-state voice switching.

III. Detailed Explanation Of Tri-State Transitions For Voice Switching

Figure 5:
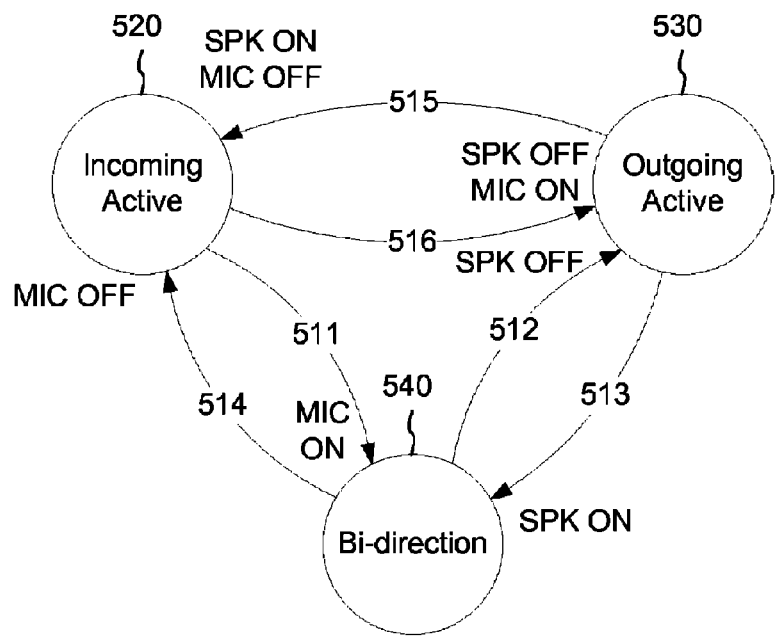
FIG. 5 is a state diagram illustrating a tri-state transitions of the voice switching method used in the communication system of FIG. 4.

The tri-state voice switching 410 has a three state operation illustrated by the state diagram in FIG. 5. These include an incoming state 520, outgoing state 530, and bi-direction state 540. The incoming and outgoing states are referred to as active states. The channel that is switched on in the actives states is referred to as being the active channel. The user who occupies the active channel is referred to as the active user. In the incoming state, the speaker channel is switched on and is the active channel. The far end user therefore is the active user. In the outgoing state, the microphone channel is switched on and is the active channel. The near end user is the active user in the outgoing state.

The third state is called the bi-direction state 540, and has both microphone and speaker channels switched on. When both ends are quiet, the system enters the bi-direction state and monitors the voice activity on both ends. If voice activity is detected on one end, the system leaves the bi-direction state and transitions to one of the active states based on which end is active. The bi-direction state operates to help ensure smooth channel switching without losing an initial syllable or word upon voice activity onset of the next active user.

The tri-state switching 410 of the communication end device 400 allows for two different types of conditions to trigger switching from one active channel to the other: voluntary and forced transitions.

One condition (the voluntary transition condition) is when the active user voluntarily gives up the active channel by ceasing voice activity. The system detects a silence segment in the active user's voice activity is longer than a threshold delay, and enters the bi-direction state 540. Thereafter, when the other end user begins talking, the active channel is then switched to that user.

The other condition (forced transition) is when the active user is forcedly interrupted by the user on the other end. The forced transition happens when the user on the other end wants to interrupt the active user, and does so by speaking sufficiently louder than the active user. Because it is difficult to accurately determine which end has stronger voice activity during such "double-talk" scenarios (e.g., due to variance in speaker and microphone gain), this "sufficiently louder" means louder enough that the voice activity on the inactive channel is really louder than the voice on the active channel to account for most microphone-speaker configurations. In other words, the condition uses a threshold ratio of inactive to active channel voice energy chosen to account for gain variance of most microphone-speaker configurations.

In more detail, the incoming state 520 is one in which the microphone channel (i.e., the mic[n] or outgoing channel) is completely muted, and the speaker channel (i.e., the spk[n] or incoming channel from the other end) is on. That is to say, the other end user is the active user and the speaker channel is the active channel. The system is in the incoming state when the other end's user is talking.

The outgoing state 530 has the microphone channel on, while the speaker channel is muted or attenuated. This means the near end user and microphone channel are active. The system is in the outgoing state when the near end user is talking.

On the other hand, both channels are on in the bi-direction state 540. The bi-direction state is the state where both near-end and far-end users are quiet. This is the initial state of the system.

During operation, the tri-state voice switching 410 makes transitions 511-516 between the bi-direction, incoming, and outgoing states. As indicated above, the tri-state switching 410 begins in the bi-direction state, where both microphone and speaker channels are switched on.

From the bi-direction state 540, the tri-state switching 410 can make transitions 512, 514 to the outgoing or incoming states. The tri-state switching 410 remains in the bi-direction state while both near-end and far-end users are quiet. The transition 512 from the bi-direction state to the outgoing state 530 is conditioned on detecting near-end voice activity for more than 50 milliseconds. On the other hand, the transition 514 from the bi-direction state to the incoming state 520 is conditioned on detecting far-end voice activity for more than 20 milliseconds.

After the transition 512 to the outgoing state 530 or the transition 514 to the incoming state 520, the tri-state switching remains in the outgoing or incoming state while voice activity solely from the near-end or far-end user continues, respectively. In these states, the near-end or far-end user can voluntarily relinquish exclusive use of the voice channel by ceasing to talk. If this occurs, the tri-state switching returns to the bi-direction state via transitions 511, 513. The voluntary transition 511 from the incoming state 520 to the bi-direction state 540 is conditioned on the far-end user being quiet for more than 100 milliseconds. The condition for the voluntary transition 513 from the outgoing state 530 to the bi-direction state 540 is that the near end user is quiet for more than 800 milliseconds.

On the other hand, the tri-state switching 510 also can make forced or voluntary transitions 515, 516 directly between the incoming state 520 and the outgoing state 530. The transition 515 from the outgoing state to the incoming state can occur under either a voluntary condition or a forced condition. The voluntary condition occurs if the near-end user is quiet for more than 400 milliseconds and far-end voice activity is detected for more than 50 milliseconds. The forced condition is that the far-end voice energy peak is stronger than the near-end voice energy peak by more than 25 times stronger for more than 400 milliseconds and the far-end voice activity is detected for more than 100 milliseconds.

The transition 516 from the incoming state directly to the outgoing state also can occur under a forced condition. The forced condition is that the near-end voice activity is four times stronger than the far-end voice (measured by energy peak) for more than 100 milliseconds, and the near-end voice activity is detected for more than 100 milliseconds.

IV. Computing Environment

The two-way communication end device 400 shown in FIG. 4 can be implemented as dedicated or special purpose communication device (e.g., a desktop phone, in which the acoustic echo cancellation quality check and tri-state switching 410 is implemented using a digital signal processor programmed by firmware or software to operate as illustrated in FIG. 5.

Figure 6:
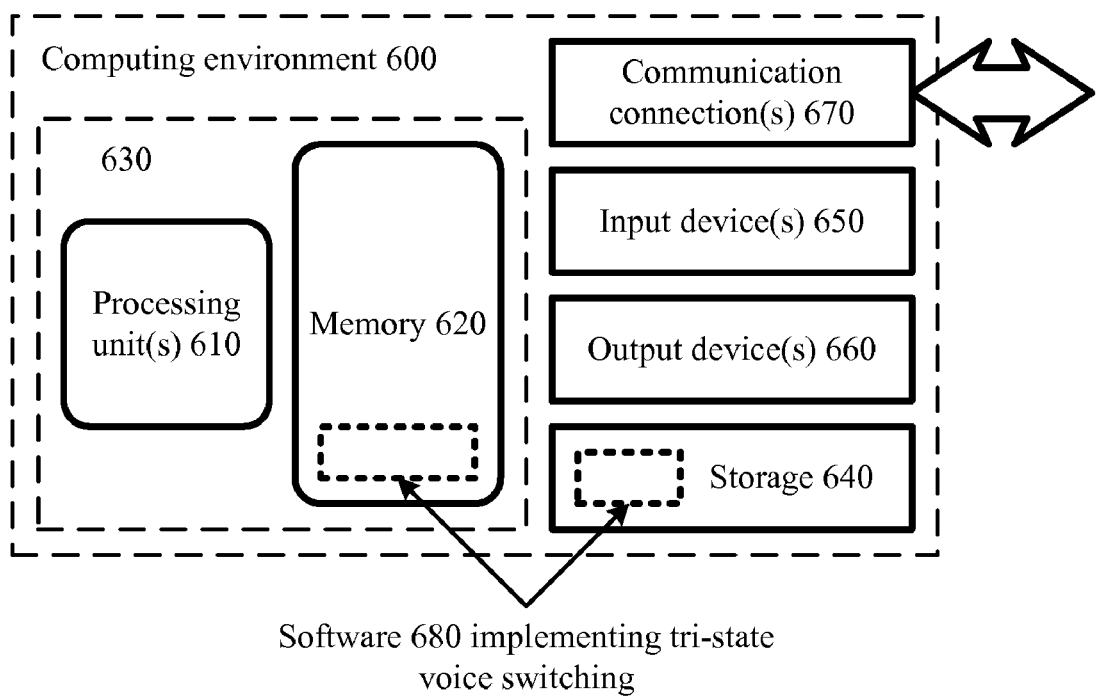
FIG. 6 is a block diagram of a generalized operating environment in conjunction with which various described embodiments may be implemented.

Alternatively, the two-way communication system can be implemented using a general purpose computer with suitable programming to perform the quality check and tri-state switching operation using a digital signal processor on a sound card, or even the central processing unit of the computer to perform the digital audio signal processing. For example, the two-way communication system can be a laptop or desktop computer with voice communication software (e.g., a telephony, voice conferencing or voice chat application software). Alternatively, the two-way communication system can be a mobile computing device that provides voice communication. FIG. 6 illustrates a generalized example of a suitable computing environment 600 in which the two-way communication system 400 with tri-state voice switching 410 may be implemented on such general purpose computers. The computing environment 600 is not intended to suggest any limitation as to scope of use or functionality, as described embodiments may be implemented in diverse general-purpose or special-purpose computing environments, as well as dedicated audio processing equipment.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The processing unit also can comprise a central processing unit and co-processors, and/or dedicated or special purpose processing units (e.g., an audio processor or digital signal processor, such as on a sound card). The memory 620 may be volatile memory (e.g., registers, cache, RAM), non-volatile memory (e.g., ROM, EEPROM, flash memory), or some combination of the two. The memory 620 stores software 680 implementing one or more audio processing techniques and/or systems according to one or more of the described embodiments.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for software executing in the computing environment 600 and coordinates activities of the components of the computing environment 600.

The storage 640 may be removable or non-removable, and includes magnetic disks, magnetic tapes or cassettes, CDs, DVDs, or any other medium which can be used to store information and which can be accessed within the computing environment 600. The storage 640 stores instructions for the software 680.

The input device(s) 650 may be a touch input device such as a keyboard, mouse, pen, touchscreen or trackball, a voice input device, a scanning device, or another device that provides input to the computing environment 600. For audio or video, the input device(s) 650 may be a microphone, sound card, video card, TV tuner card, or similar device that accepts audio or video input in analog or digital form, or a CD or DVD that reads audio or video samples into the computing environment. The output device(s) 660 may be a display, printer, speaker, CD/DVD-writer, network adapter, or another device that provides output from the computing environment 600.

The communication connection(s) 670 enable communication over a communication medium to one or more other computing entities. The communication medium conveys information such as computer-executable instructions, audio or video information, or other data in a data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments can be described in the general context of computer-readable media. Computer-readable media are any available media that can be accessed within a computing environment. By way of example, and not limitation, with the computing environment 600, computer-readable media include memory 620, storage 640, and combinations of any of the above.

Embodiments can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing environment.

For the sake of presentation, the detailed description uses terms like "determine," "receive," and "perform" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of preventing acoustic echo in a two-way voice communication end device, the method comprising: upon starting a communication session with another communication end device, operating in a full duplex voice communication with acoustic echo cancellation mode; performing at least one quality check; determining whether the voice communication with the other communication end device has sufficient quality for effective acoustic echo cancellation; and in the event that the voice communication is determined to lack sufficient quality, operating in a tri-state voice switching mode; wherein operating in the tri-state voice switching mode comprises: operating in an outgoing state when voice activity is detected on an outgoing channel; operating in incoming state when voice activity is detected on an incoming channel; operating in a bi-directional state when voice activity ceases for over a threshold period of time while in the incoming or outgoing states; from the incoming state, forcing a transition to the outgoing state when there is voice activity on both the incoming and outgoing channels, but a first energy level associated with the volume of the voice activity on outgoing channel exceeds a second energy level associated with the volume of the voice activity on the incoming channel by a predetermined amount.

2. The method of claim 1 wherein said performing at least one quality check comprises performing a plurality of quality check at intervals over a starting period of the communication session.

3. The method of claim 1 wherein said operating in a tri-state voice switching mode further comprises: upon detecting stronger volume of voice activity in the not active channel when in the incoming or outgoing state, switching between incoming and outgoing states.

4. The method of claim 3 wherein said detecting stronger volume of voice activity comprises detecting the voice energy peak associated with the volume of voice activity of the not active channel is more than a threshold multiple stronger for a threshold period than the active channel.

5. The method of claim 1, wherein the forcing of the transition occurs only when the first energy level associated with a volume of voice activity exceeds the second energy level associated with a volume of voice activity by the predetermined amount for a predetermined period of time.

6. A method of preventing acoustic echo in a two-way voice communication end device, the method comprising: detecting voice activity in incoming and outgoing voice channels of the two-way voice communication end device; determining in which of a plurality of voice switching states to operate based on said voice activity detecting, the voice switching states comprising at least a bi direction state in which both the incoming and outgoing voice channels are both switched on effecting full duplex communication, an incoming channel active state in which the incoming channel only is switched on to be active, and an outgoing channel active state in which the outgoing channel is switched on to be active;

wherein the bi-directional state is entered when voice activity ceases for over a threshold period of time; and forcing a transition from the incoming channel active state to the outgoing channel active state or vice versa based on a comparison between energy levels associated with the volume of voice activity on the incoming and outgoing voice channels.

7. The method of claim 6 wherein said determining in which of the voice switching states to operate comprises: upon detecting sufficiently louder voice activity on the non-active channel for longer than a threshold duration, making a direct transition between incoming and outgoing channel active states.

8. The method of claim 7 wherein detecting sufficiently louder voice activity comprises detecting voice activity on the non-active channel more than a sufficiency factor louder than the voice activity on the active channel.

9. The method of claim 6, wherein the forcing of the transition occurs only when the comparison of the energy levels associated with a volume of voice activity results in a difference that is sustained for a predetermined period of time.

10. A two-way voice communication end device comprising:
an incoming speaker channel for receiving an incoming voice signal from another end device for playing to a user; an outgoing microphone channel for capturing an outgoing voice signal from the user for sending to said other end device; a tri-state voice switch selectively switching between multiple voice states comprising at least a bi-direction state providing full duplex communication via the incoming and outgoing channels, and incoming and outgoing active states in which a respective one of the incoming and outgoing voice channels is switched on to be active; and wherein the voice switching means forces a switching between the incoming voice channel and the outgoing voice channel based on an energy level associated with the volume of voice activity comparison between the two channels when both users are speaking simultaneously.

11. The two-way voice communication end device of claim 10 wherein the tri-state voice switch effects transitions between incoming and outgoing active states under a voluntary transition condition in which voice activity ceases for longer than a silence segment duration on the incoming and outgoing voice channels by first switching to the bi-direction state before switching to one of the incoming and outgoing active states when voice activity is again present on either the incoming or outgoing voice channels.

12. The two-way voice communication end device of claim 10 wherein the tri-state voice switch effects transitions between incoming and outgoing active states under a forced transition condition in which voice activity on a non-active one of the incoming and outgoing voice channels is sufficiently louder than voice activity on the active one of the incoming and outgoing voice channels by directly switching between incoming and outgoing active states.

13. The two-way voice communication end device of claim 12 wherein the force transition condition is that the voice activity on the non-active channel is more than a sufficiency factor louder than the voice activity on the active channel.

14. The method of claim 10, wherein the forcing of the switching occurs when the energy level associated with a volume of voice activity comparison indicates a difference in energy levels that is sustained for a predetermined period of time.

\* \* \* \* \*

UNITED STATES PATENT AND TRADEMARK OFFICE
CERTIFICATE OF CORRECTION

| | |
|---|---|
| PATENT NO. | : 8,380,253 B2 |
| APPLICATION NO. | : 12/032589 |
| DATED | : February 19, 2013 |
| INVENTOR(S) | : Li et al. |

Page 1 of 1

It is certified that error appears in the above-identified patent and that said Letters Patent is hereby corrected as shown below:

<u>Column 11,</u>

Lines 17-18, "wherein the voice switching means forces a switching between the incoming" should be --wherein the tri-state voice switch forces a switching between the incoming--.

Signed and Sealed this
Ninth Day of April, 2013

Teresa Stanek Rea
*Acting Director of the United States Patent and Trademark Office*